United States Patent
Baik et al.

(10) Patent No.: US 6,998,446 B2
(45) Date of Patent: Feb. 14, 2006

(54) UNBALANCED MULTI-BLOCK SBS AND METHOD FOR THE PREPARATION THEREOF

(75) Inventors: Nam Hoon Baik, Daejeon (KR); Seung Il Kim, Daejeon (KR); Dong Hyuk Na, Daejeon (KR); Sun Woo Cheen, Daejeon (KR); Byoung Tak Yim, Daejeon (KR)

(73) Assignee: Korea Kumho Petrochemical Co., Ltd., Seoul (KR)

(*) Notice: Subject to any disclaimer, the term of this patent is extended or adjusted under 35 U.S.C. 154(b) by 179 days.

(21) Appl. No.: 10/624,248

(22) Filed: Jul. 22, 2003

(65) Prior Publication Data

US 2005/0101730 A1    May 12, 2005

(30) Foreign Application Priority Data

Jul. 26, 2002    (KR) .................... 10-2002-0044073

(51) Int. Cl.
*C08F 297/04*    (2006.01)

(52) U.S. Cl. ........................... 525/314; 525/271

(58) Field of Classification Search ............... 525/271, 525/314

See application file for complete search history.

(56) References Cited

U.S. PATENT DOCUMENTS

| | | | |
|---|---|---|---|
| 3,231,635 A * | 1/1966 | Holden et al. | ............... 525/271 |
| 3,265,765 A | 8/1966 | Holden et al. | |
| 4,051,199 A | 9/1977 | Udipi et al. | |
| 4,163,764 A | 8/1979 | Nash | |
| 4,603,155 A | 7/1986 | Muramori et al. | |
| 4,874,821 A | 10/1989 | Agostinis et al. | |

\* cited by examiner

Primary Examiner—Fred Teskin
(74) *Attorney, Agent, or Firm*—Squire, Sanders & Dempsey L.L.P.

(57) ABSTRACT

The present invention relates to the unbalanced multi-block styrene-butadiene-styrene (SBS) and provides the copolymer represented by the following structure, $mB1*S1-lB2-S2-sB3$, wherein B is a butadiene block, S is a styrene block, l, m, s are the relative size among the blocks (i.e., large size, middle size, and small size, respectively), and * is the tapered block between mB1 block and S1 block (i.e., random copolymer of a kind). They have to satisfy the following related expressions.

$0.01lB2 \leq mB1 \leq 0.5lB2$ and $0.01mB1 \leq sB3 \leq 0.5mB1$    a)

$0.5S1 \leq S2 \leq 1.5S1$    b)

$5\% \leq *\% \leq 25\%$    c)

In the related expression, the value of B1 and S1 include tapered block for the sake of convenience, and *% is the random styrene content in all the styrene in SBS.

The unbalanced multi-block SBS of this invention exhibits excellent processability in the preparation of hot-melt adhesives, reducing processing hours. It also exhibits good adhesive properties such as initial loop tack, 180° peel strength, and holding power, and it has a normal level of heat resistance.

6 Claims, No Drawings

UNBALANCED MULTI-BLOCK SBS AND METHOD FOR THE PREPARATION THEREOF

PRIORITY REFERENCE TO PRIOR APPLICATION

This application claims benefit under 35 U.S.C. §119 of Korean patent application number 10-2002-0044073, entitled "Unbalanced Multi-Block SBS And Method for the Preparation Thereof," filed on Jul. 26, 2002, by inventors Nam Hoon Baik, Seung Il Kim, Dong Hyuk Na, Sun Woo Cheen, and Byoung Tak Yim.

FIELD OF THE INVENTION

The invention relates to SBS for the hot-melt adhesives. More particularly, it relates to the unbalanced multi-block SBS that gives excellent adhesive properties without lowering heat resistance, exhibits good processability in the preparation of adhesives and enhances the productivity.

PRIOR ART

Generally, SBS refers to the block copolymer containing tri-block of styrene-butadiene-styrene. Besides being used for the hot-melt adhesives, it has various purposes including as modifier of asphalt and plastic and compounding. In the case of SBS used for the hot-melt adhesives, processability is an important property to ensure good adhesive properties. For SBS used for other purposes, however, the mechanical property is important.

In the preparation of hot-melt adhesives using SBS, the first thing to consider is its compatibility and solubility with other materials such as oil and tackifier. If it does not mix well with these materials, the adhesive properties become poor and the heat resistance is reduced, producing a low class adhesive. The appropriate SBS that satisfies the adhesive properties and heat resistance together with the processability should be selected.

There have been many efforts to prepare such a hot-melt adhesive. In the early development stage of the hot-melt adhesive, the traditional styrene-butadiene-styrene tri-block introduced in U.S. Pat. No. 3,265,765 is used as the adhesive's component. The hot-melt adhesive prepared with this type of SBS gives good holding power, but the processability and other adhesive properties are not satisfying. As a result, its use becomes restricted.

To make up for such defects, the method described in U.S. Pat. No. 4,163,764 uses linear or radial type of SBS prepared by various coupling agents, which shows some improvement in the processability. However, in this method, the resulting adhesive properties are still not very different from those of the previously described tri-block SBS.

There have also been attempts to use tapered block SBS, which has some random part between butadiene block and styrene block, introduced in U.S. Pat. No. 4,051,199 to improve the processability and adhesive properties of the pure block SBS. Some improvement in the processability was achieved but the other properties are not good as before.

Whether it is a pure block or a tapered block, such a general tri-block SBS still has restricted use. In order to eliminate such restriction, the multi-block SBS is used for the hot-melt adhesive. Among the SBS for the hot-melt adhesive, relatively satisfying results have been accomplished with the unbalanced tetra-block SBS of U.S. Pat. No. 4,874,821 and the mid-tapered multi-block SBS of U.S. Pat. No. 4,603,155.

The method described in U.S. Pat. No. 4,874,821 is the use of SBS with an unbalanced tetra-block, such as styrene/butadiene-styrene-butadiene. The structure has styrene/butadiene tapered block in front and styrene-butadiene pure block at the rear. When the hot-melt adhesive is prepared with such characteristic SBS, the best adhesive properties and processability are achieved. However, the oxygen present in the reaction atmosphere or in the reaction terminator may cause unwanted oxygen coupling reaction to occur up to 20% in the polymerization or termination step. This side reaction increases the molecular weight by twice as much, making it difficult to control the molecular weight in the polymerization process. When this coupling reaction increases, the melt-flow index (MI) of the SBS decreases and lowers the processability and adhesive properties. This type of SBS, though it is better than the other SBS described, does not give satisfactory 180° peel strength.

In U.S. Pat. No. 4,603,155, a novel multi-block SBS was introduced. This multi-block has more than two butadiene/styrene tapered blocks in the middle butadiene block of styrene-butadiene-styrene block. It has a styrene-butadiene/styrene-butadiene/styrene-butadiene-styrene type structure, middle tapered multi-block SBS. It exhibits some satisfactory processability and adhesive properties. As the number of butadiene/styrene tapered block increases, better adhesive properties are produced. However, this type of SBS is also accompanied by the oxygen coupling reaction due to the terminal polystyryl anion. Furthermore, it is difficult to commercialize because of the complex polymerization step involved.

SUMMARY OF THE INVENTION

The present invention aims to solve such problems and to provide the SBS that results in an adhesive with excellent adhesive properties and a certain level of heat resistance. The present invention also aims to provide the SBS to reduce the manufacturing time of hot-melt adhesive by means of its excellent solubility with the tackifier and oil. Lastly, the present invention aims to provide the SBS having no terminal polystyryl anion so that the molecular weight can be controlled well.

DETAILED DESCRIPTION OF THE INVENTION

The objectives of the present invention are achieved using the polymer having the following molecular structure.

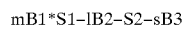

In this structure, B is a butadiene block; S is a styrene block; l, m, and s refer to the relative size among the blocks, i.e., large size, middle size, and small size, respectively; * is the tapered block between mB1 block and S1 block, i.e., a random copolymer part of a kind. They have to satisfy the following related expressions.

$0.01 lB2 \leq mB1 \leq 0.5 lB2$ and $0.01 mB1 \leq sB3 \leq 0.5 mB1$     a)

$0.5 S1 \leq S2 \leq 1.5 S1$     b)

$5\% \leq *\% \leq 25\%$     c)

In the related expression, the value of B1 and S1 include tapered block for the sake of convenience, and * % refers to the random styrene content in all the styrene in SBS.

Anionic polymerization using alkyllithium as initiator in the hydrocarbon solvent is used to prepare an unbalanced multi-block SBS. The mB1*S1 is made by adding simultaneously the first portion of butadiene and the first portion of styrene. This can also be done by adding the first portion of butadiene and a part of the first portion of styrene by splitting S1, running the reaction completely, adding the rest of the first portion of styrene, and running the reaction. After mB1*S1 is formed, the second portion of butadiene is charged to complete the reaction. And then the second portion of styrene is charged, again running the reaction completely. Finally, the third portion of butadiene is charged to run the reaction.

The term 'SBS' in the present invention refers to the styrene-butadiene block copolymer, which includes styrene-butadiene-styrene blocks regardless of their block number. 'Unbalanced' means that the block type is not uniformly present as tapered blocks or pure blocks, the butadiene-styrene tapered block and the pure butadiene-styrene block coexist, and each component block has a different size.

The 'tapered block' refers to a kind of random part between the blocks. This tapered block is formed because of the different reactivity of butadiene and styrene when they are charged together and anion polymerization proceeds with the initiator, alkyllithium. Butadiene reacts first and when it is mostly consumed, styrene reacts. At the boundary of the two blocks, random copolymer and small blocks are formed. The styrene block gets bigger and bigger afterwards. This kind of random copolymer and small blocks is called tapered block. Nuclear magnetic resonance (NMR) method is used to analyze the tapered block content. Because the amount of this content is the important factor in deciding the property of SBS, the present invention presents the range in a precise value.

In the polymerization of SBS in the present invention, styrene and 1,3-butadiene are the monomers while. alkyllithium, such as n-butyllithium and sec-butyllithium, is the initiator. The initiator can be added one portion at a time or added continuously before the formation of the tapered block. The solvent used is chosen from cyclohexane, n-hexane, n-heptane, and toluene, or their mixture. The weight ratio of the solvent to monomer is 3/1–8/1. The solvent can be added at a time at the beginning of the reaction or in 2 to 3 portions if necessary.

The initiation temperature of the polymerization can be at any temperature at which the polymerization is possible. If the reaction temperature is too low, the reaction takes too long, giving low productivity. On the other hand, too high temperature occurs in the cross-linking reaction of some part of the polymer chain, making the physical properties of SBS undesirable. It is recommended that the temperature in the polymerization process be not more than 130° C. and the initiation temperature of the reaction be 30–70° C.

In the present invention, the vinyl content in the butadiene block of SBS ranges from 8–50%. The lowest vinyl content in the anion polymerization, using alkyllithium, is about 8%. Usually, adding an amount of tetrahydrofuran controls the vinyl content. When the vinyl content reaches more than 50%, the adhesive property deteriorates.

In the present invention, the styrene content ranges from 20–50%. If the styrene content is below 20%, heat resistance becomes poor to the extent that the product cannot be used as the hot-melt adhesive. If it is over 50%, the adhesive property deteriorates.

The amount of the alkyllithium initiator added changes based on the target MI value, namely, target molecular weight. The calculation of the theoretical number average molecular weight is in accordance with the following equation.

$$\frac{\text{Total amount of charged monomer (g)}}{\text{Amount of alkyllithium (mole)}} = \text{number average molecular weight (Mn)}$$

The range of MI by G type (200° C.×5 kg) is 0.01–50 g/10 min, more preferably 5–40 g/min. The corresponding amount of alkyllithium is in the range of 1.0–2.5 mmol per 100 g of monomer.

The following gives the representative order of polymerization for the unbalanced multi-block, mB1*S1–lB2–S2–sB3. To a 12-L batch polymerization reactor, 5 kg of cyclohexane (S/M=5) and 0.15 g (30 ppm based on the solvent) of tetrahydrofuran were charged and 180 g of styrene and 110 kg of 1,3-butadiene were charged. The reactor was heated to 60° C. and 0.019 mole of n-butyllithium was added to start the reaction. After 20 minutes, the temperature reached 73° C., the first highest temperature, and mB1 block was completed. After another 20 minutes, the temperature reached 79° C., the second highest temperature, and during this period S1 block was completed. After 10 minutes, 470 g of 1,3-butadiene was charged. Twenty (20) minutes later, the temperature reached 92° C., the third highest temperature, and lB2 block was completed. After another 10 minutes, 220 g of styrene was charged and the reaction continued. In 10 minutes, the fourth highest temperature, 85° C., was attained. During this period, the S2 block was already under completion. After 10 minutes, 20 g of 1,3-butadiene was charged and the sB3 block formation reaction proceeded for 20 minutes. As can be observed, in each step of the process, after the highest temperature was reached, there was 10 minutes aging time in order to exhaust the monomer completely for the next reaction.

During the polymerization reaction, in preparing the unbalanced multi-block SBS of the present invention, the amount of monomers added should be controlled for the blocks to satisfy the related expression, $0.011B2 \leq mB1 \leq 0.5lB2$ and $0.01mB1 \leq sB3 \leq 0.5mB1$, and $0.5S1 \leq S2 \leq 1.5S1$.

If the mB1 butadiene block is smaller than the specified range, the processability and adhesion property become inferior. If it exceeds the specified range, the processability and adhesion property are improved; however, the holding power and elongation decrease. In case sB3 is smaller than the specified range, the holding power and 180° peel strength of the adhesive decrease. Conversely, if it is bigger, the elongation and adhesive property become inferior. And if the styrene block is out of the range of the related expression, all adhesive properties except initial loop tack become inferior.

The random styrene content in tapered block should satisfy the related expression, $5\% \leq$ random styrene content $\leq 25\%$ in all the styrene content of S1 and S2 block. If the tapered block is smaller than the range specified in this expression, the solubility and initial loop tack become poor. Conversely, if it is bigger, the heat resistance and holding power of the adhesive become inferior. Such content of tapered block is naturally controlled if the polymerization reaction progresses according to the described procedure.

Styrene and butadiene are charged together to make a tapered block to a certain extent between the initial butadiene and styrene block. S1 can be charged in split within the range of 5%≦*%≦25% to obtain the pure styrene block part. After adding mB1 and a portion of S1 and after the reaction is complete, the remaining S1 is added.

The unbalanced initial tapered block type characterizes the present invention. If all the blocks were uniformly of tapered block or pure block, or unbalanced latter tapered block type, satisfying adhesive property could not be expected. If all the blocks were in the form of tapered block type, the initial loop tack would get better, but heat resistance and holding power become inferior. If all were pure types, all the adhesive properties except holding power and processability would become inferior. And if latter tapered block form were taken, both processability and adhesiveness would become inferior.

Upon completion of the polymerization reaction, the activity of butadienyl anion formed at the terminal chain should be deactivated. The terminator to be used can be selected freely from the commonly used terminators in this field. Examples of these are water, alcohols, organic acid, inorganic acid, and halogenated compounds of Group IV atom. Appropriate antioxidant is used to prevent oxidation of the polymer chains. The antioxidant can be chosen from the usual antioxidants used in this field, such as BHT, Irganox 1076, Irganox 1520, Irganox 565, and TNPP. It can be used alone or in the mixture.

In the following, through example and comparative examples, the present invention is illustrated concretely. These examples do not limit the technical scope of the present invention.

In the example and the comparative examples, for the accuracy of the experiments, 5 g of water was used equally as the reaction terminator while 0.2 PHR of Irganox 1076 and 0.2 PHR of TNPP were used uniformly as antioxidant.

The polymer solution obtained from the polymerization reaction of the example and the comparative examples existed in viscous state and had the consistency of honey. To remove the solvent, steam-stripping process was carried out. After that, the SBS crumb containing water was dried by roll mill at 120° C. and extruded into the sheet of 3 mm thickness. It was cut to the size of about 0.5×0.5 cm for easy melting of the SBS in the preparation of the hot-melt adhesive.

The preparation of the hot-melt adhesive and the analysis of the physical properties were carried out in the usual manner used in the adhesive manufacturing company. About 50 g of SBS chips of 0.5×0.5 cm size prepared as described above, 110 g of tackifier, 39 g of oil, and 1 g of antioxidant were added to the stainless steel (SUS) vessel. The mixture was then melted and stirred at 150–160° C. for 3 hours. To minimize the thermal aging in high temperature, the process was done under nitrogen atmosphere.

Adhesive properties were measured according to the usual method employed. The softening point was measured by the method described in ASTM E28. Elevating the temperature of glycerin gradually by 5° C./min rate, the temperature at which the iron ball on the adhesive drops one inch below was measured as the softening point. The initial loop tack was determined by the method of ASTM D6195, in which the test specimen was cut in 7 inches and a stainless steel plate was used as a test panel. The 180° peel strength was measured by removing tape specimen with 1 inch from the stainless steel plate in 180° by 300 mm/min rate. Before the test, the mechanical rolling at a rate of 300 mm/min was applied to the tape of the panel using a 2-kg roller. This was done to prevent the entrapment of air between the adhesive and the panel. The holding power was determined according to the time in which the tape attached to stainless steel plate by 0.5×0.5 inches with 1 kg of weight became fully detached from the plate.

The chemicals and the related items used in preparation of hot-melt adhesive are as shown in Table 1.

TABLE 1

| Materials | Trade Name | Manufacturer | Content (wt %) |
|---|---|---|---|
| SBS | Polymers from example 1 and comparative examples 1–7 | Lab. | 25 |
| Tackifier resin | Escorez 5600 | Exxon | 55 |
| Oil | White Oil 2150 | Mi Chang Petroleum Co. | 19.5 |
| Antioxidant | Irganox 1010 | Ciba Specialty Chemicals. | 0.5 |

EXAMPLE 1

Under nitrogen atmosphere, 5 kg of cyclohexane, 0.15 g of tetrahydrofuran, 180 g of styrene, and 110 g of 1,3-butadiene were added and mixed in a 12-L reactor. The reactor was then heated to 60° C., and 0.019 mole of n-butyllithium was added and the reaction was initiated. The exothermic reaction attained the highest temperature. After 10 minutes, when all the monomers were consumed, 470 g of 1,3-butadiene was added and the reaction was allowed to continue. After 10 minutes, highest reaction temperature was reached, and 220 g of styrene was added and the reaction continued. Then, after another 10 minutes, 20 g of 1,3-butadiene was added and the reaction was run further for 20 minutes. Next, 5 g of water was added to terminate the reaction, and each 0.2 PHR of Irganox 1076 and TNPP were added as antioxidants. SBS chips were then obtained as described above. The preparation of the adhesive and the measurement of the properties were conducted in sequence as described above. All the properties of the polymers and adhesives including the present example are listed in Table 2.

Comparative Example 1

Under nitrogen atmosphere, 5 kg of cyclohexane, 0.15 g of tetrahydrofuran, and 200 g of styrene were added and mixed in a 12-L reactor. Heating the reactor to 60° C., 0.021 mole of n-butyllithium was added and the reaction was initiated. The reaction was exothermic and reached the highest temperature after 10 minutes. Then 600 g of 1,3-butadiene was added and the reaction was run further. After another 10 minutes, the next highest reaction temperature was reached, and 200 g of styrene was added. The reaction continued for 20 more minutes. Finally, 5 g of water was added to terminate the reaction. Further experiment conducted was the same as described in [Example 1].

Comparative Example 2

Under nitrogen atmosphere, 5 kg of cyclohexane, 0.15 g of tetrahydrofuran, and 400 g of styrene were added and mixed in a 12-L reactor. Heating the reactor to 60° C., 0.036 mole of n-butyllithium was added and the reaction was initiated. The reaction was exothermic, and after 10 minutes the highest temperature was reached. Then 600 g of 1,3-butadiene was added and the reaction was run further. After another 10 minutes, the next highest reaction temperature was reached. Then 0.016 mole of dimethyl-dichlorosilane was added and the coupling reaction was run. After the coupling reagent was added, the reaction was continued further for 20 minutes. Finally, 5 g of water was added to terminate the reaction. Further experiment was the same as described in [Example 1].

Comparative Example 3

Under nitrogen atmosphere, 5 kg of cyclohexane, 0.15 g of tetrahydrofuran, and 200 g of styrene were added and mixed in a 12-L reactor. Heating the reactor to 60° C., 0.021 mole of n-butyllithium was added and the reaction was initiated. The reaction was exothermic, and after 10 minutes the highest temperature was reached. Then 600 g of 1,3-butadiene and 200 g of styrene were added and the reaction was run further. After 10 minutes the next highest reaction temperature was reached, and 5 g of water was added to terminate the reaction. Further experiment was the same as described in [Example 1].

Comparative Example 4

Under nitrogen atmosphere, 5 kg of cyclohexane, 0.15 g of tetrahydrofuran, 200 g of styrene, and 100 g of 1,3-butadiene were added and mixed in a 12-L reactor. Heating the reactor to 60° C., 0.02 mole of n-butyllithium was added and the reaction was initiated. The reaction was exothermic, and after 10 minutes, the highest temperature was reached. Then 500 g of 1,3-butadiene was added and the reaction was run further. After 10 minutes, the next highest reaction temperature was reached, and 200 g of styrene was added. Finally, after the next highest reaction temperature reaction was reached in 10 minutes, 5 g of water was added to terminate the reaction. Further experiment was the same as described in [Example 1].

Comparative Example 5

Under nitrogen atmosphere, 5 kg of cyclohexane, 0.15 g of tetrahydrofuran, and 170 g of styrene were added and mixed in a 12-L reactor. Heating the reactor to 60° C., 0.02 mole of n-butyllithium was added and the reaction was initiated. The reaction was exothermic, and after 10 minutes, the highest temperature was reached. Then 200 g of 1,3-butadiene and 30 g of styrene were added and the reaction was run further. After another 10 minutes, the next highest reaction temperature was reached, 200 g of 1,3-butadiene and 30 g of styrene were again added and the reaction was run further. After the next highest reaction temperature was reached, 200 g of 1,3-butadiene were added and the reaction was still run further. After another highest reaction temperature was reached, 170 g of styrene was added and the reaction was run further. Finally, 10 minutes after the last highest reaction temperature was reached, 5 g of water was added to terminate the reaction. Further experiment was the same as described in [Example 1].

Comparative Example 6

Under nitrogen atmosphere, 5 kg of cyclohexane, 0.15 g of tetrahydrofuran, and 110 g of 1,3-butadiene were added and mixed in a 12-L reactor. Heating the reactor to 60° C., 0.019 mole of n-butyllithium was added and the reaction was initiated. The reaction was exothermic, and after 10 minutes, the highest temperature was reached. Then 180 g of styrene was added and the reaction was run further. The next highest reaction temperature was reached after another 10 minutes, and 470 g of 1,3-butadiene and 220 g of styrene were added and the reaction was run further. Then the next highest temperature was reached after 10 more minutes, and 20 g of 1,3-butadiene was added and the reaction was run further for 20 minutes. Finally, 5 g of water was added to terminate the reaction. Further experiment was the same as described in [Example 1].

Comparative Example 7

Under nitrogen atmosphere, 5 kg of cyclohexane, 0.15 g of tetrahydrofuran, 200 g of styrene, and 200 g of 1,3-butadiene were added in a 12-L reactor. Heating the reactor to 60° C., 0.019 mole of n-butyllithium was added and the reaction was initiated. The reaction was exothermic, and after 10 minutes, the highest temperature was reached. Then 200 g of 1,3-butadiene was added and the reaction was run further. After 10 minutes, the next highest reaction temperature was reached, and 200 g of styrene was added and the reaction was run further. After another 10 minutes, the next highest temperature was reached, and 200 g of 1,3-butadiene was added and the reaction was run further for 20 minutes. Finally, 5 g of water was added to terminate the reaction. Further experiment was the same as described in [Example 1].

Comparative Example 8

Under nitrogen atmosphere, 5 kg of cyclohexane, 0.15 g of tetrahydrofuran, and 110 g of 1,3-butadiene were added and mixed in a 12-L reactor. Heating the reactor to 60° C., 0.019 mole of n-butyllithium was added and the reaction was initiated. The reaction was exothermic, and when the highest temperature was reached, 180 g of styrene was added. The reaction was run further. Ten (10) minutes later, the next highest reaction temperature was reached, and 470 g of 1,3-butadiene was added. The reaction was still run further. After another 10 minutes, the next highest temperature was reached, and 220 g of styrene was added and the reaction was run further. Then after another 10 minutes, the next highest temperature was reached, and 20 g of 1,3-butadiene was added. The reaction was still run further for 20 minutes. Finally, 5 g of water was added to terminate the reaction. Further experiment was the same as described in [Example 1].

The physical properties of the polymer and adhesive property obtained in Example 1 and Comparative Examples 1–8 are shown in Table 2.

TABLE 2

| | | Example | Comparative Example | | | | | | | |
|---|---|---|---|---|---|---|---|---|---|---|
| | | 1 | 1 | 2 | 3 | 4 | 5 | 6 | 7 | 8 |
| Physical property of SBS | Structure | B/S-B-S-B (different size blocks) | S-B-S | SBS + SB | S-B/S | B/S-B-S | S-B/S-B/S-B-S | B-S-B/S-B | B/S-B-S-B (same size blocks) | B/S-B-S-B (tapered block 2%) |
| | MI (g/10 min; 200° C. × 5 kg) | 13 | 12 | 12 | 12 | 13 | 12 | 12 | 14 | 13 |

TABLE 2-continued

| | | Example | Comparative Example | | | | | | | |
|---|---|---|---|---|---|---|---|---|---|---|
| | | 1 | 1 | 2 | 3 | 4 | 5 | 6 | 7 | 8 |
| | Styrene Content (wt %) | 40 | 40 | 40 | 40 | 40 | 40 | 40 | 40 | 40 |
| Adhesive Property | Solubility* | A | C | B | B | A | B | B | A | B |
| | Softening Point. [R&B](° C.) | 73 | 75 | 74 | 74 | 73 | 74 | 72 | 71 | 73 |
| | Initial Loop track (gf/in) | 2400 | 1800 | 1900 | 2000 | 2300 | 2300 | 2000 | 2400 | 2100 |
| | 180° peel strength (gt/in) | 1400 | 1000 | 1000 | 1100 | 1200 | 1300 | 1200 | 1000 | 1300 |
| | Holding power (min) | 400 | 410 | 400 | 400 | 390 | 400 | 390 | 370 | 400 |

*Solubility: the hours needed for SBS to be melted completely in tackifier and oil.
A: within 2.5 hours;
B: within 3 hours;
C: more than 3 hours.

The MI value and styrene content of above SBS samples were almost the same. However, the adhesive properties made by using each SBS were different from each other as described below.

The product in [Example 1] was unbalanced multi-block SBS, which satisfies very well the scope of the present invention and all the adhesive properties including solubility.

The product in [Comparative Example 1] was the general tri-block type SBS whose solubility was inferior. Among the adhesive properties, only the holding power was good. The product in [Comparative Example 2] was a coupled SBS. It was somewhat better than [Comparative Example 1] in terms of initial loop tack and solubility. All the physical properties were still inferior except holding power.

The product in [Comparative Example 3] was a tapered SBS of an early stage. This method showed some improvement, but all the physical properties were still inferior except holding power.

The product in [Comparative Example 4] was unbalanced tetra-block SBS. It showed good physical properties, but peel strength was a little lower than the product in [Example 1]. As described above, there was difficulty in controlling the molecular weight because the terminal block consisted of styrene.

The product in [Comparative Example 5] was middle tapered multi-block SBS in which tapered blocks existed in the middle BR-block part. It exhibited good properties in all parts. However, as described above, productivity could be a problem because of the complex preparation process.

The product in [Comparative Example 6] was similar to that in [Example 1] in structure except that the tapered block was formed in the latter part. All its physical properties were inferior to the product in [Example 1].

The product in [Comparative Example 7] had same structure as that in [Example 1] but all the blocks had same size. It was out of the scope of the present invention and does not satisfy the related expression a) and b). Its solubility and initial loop tack were good but the other properties were inferior.

The product in [Comparative Example 8] had the same structure as that in [Example 1]. However, the content of tapered block was 2%, which was out of the scope of the related expression c). Most of the properties were inferior to the product in [Example 1].

As seen in these results, the polymer in [Example 1] had excellent adhesive properties, and its solubility and heat resistance were in proper level.

EFFECT OF THE INVENTION

As seen above, the unbalanced multi-block SBS in the present invention had excellent processability in preparing the hot-melt adhesive, shortening the working hours. It also had good loop tack, 180° peel strength, good holding power, and appropriate heat resistance. Even with high styrene content, it had proper hardness, excellent elongation, and appropriate mechanical properties. Therefore, it could be used as general purpose of SBS, asphalt modifier, plastic modifier, and in compounding.

What is claimed is:

1. An unbalanced multi-block SBS copolymer with the following structure, mB1*S1–lB2–S2–sB3,
   wherein B is a butadiene block, S is a styrene block, l, m, s are relative size among the blocks, wherein l>m>s, and * is the tapered block between mB1 block and S1 block, and they also have to satisfy the following related expressions:

0.01lB2≦mB1≦0.5lB2 and 0.01mB1≦sB3≦0.5mB1    a)

0.5S1≦S2≦1.5S1    b)

5%≦*%≦25%    c)

In the related expressions, the value of B1 and S1 include tapered block, and *% means the random styrene content in all the styrene in SBS.

2. The unbalanced multi-block SBS copolymer of claim 1, wherein the contents of styrene range from 20 to 50%.

3. The unbalanced multi-block SBS copolymer of claim 1, wherein the MI value of G type is 0.01 to 50 g/min.

4. The unbalanced multi-block SBS copolymer of claim 1, wherein the vinyl content ranges from 8 to 50%.

5. The polymerization method of the unbalanced multi-block SBS copolymer of claim 1 is comprised of the following steps:
   a) Making mB1*S1block containing tapered block by charging a hydrocarbon solvent, the first butadiene, and the first styrene together and using alkyllithium as an initiator and running the reaction;
   b) Making mB1*S1–lB2block by adding the second butadiene to the above mB1*S1block;
   c) Preparing mB1*S1–lB2–S2by adding the second styrene to the above mB1*S1–B2; and
   d) Making mB1*S1–lB2–S2–sB3of claim 1 by adding the third butadiene to mB1*S1–lB2–S2.

6. The polymerization method of the unbalanced multi-block SBS copolymer of claim 1 is comprised of the following steps:
   a) Making mB1*S1containing tapered block by charging a hydrocarbon solvent, the first butadiene, and a part of the first styrene together and by adding alkyllithium as an initiator, then charging the rest of the first styrene when all the monomers are consumed and continuing the reaction;
   b) Making mB1*S1–lB2block by adding the second butadiene to the above mB1*S1block;
   c) Preparing mB1*S1–lB2–S2block by adding the second styrene to the above mB1*S1–lB2; and
   d) Making mB1*S1–lB2–S2–sB3of claim 1 by adding the third butadiene to mB1*S1–lB2–S2.

* * * * *